( 12 ) United States Patent
Hoffman

(10) Patent No.: US 10,717,266 B2
(45) Date of Patent: Jul. 21, 2020

(54) 3D PRINTER INTEGRATED FILAMENT CUTTER

(71) Applicant: Robert Bosch Tool Corporation, Mount Prospect, IL (US)

(72) Inventor: Bennet Hoffman, Libertyville, IL (US)

(73) Assignee: Robert Bosch Tool Corporation, Mount Prospect, IL (US)

( * ) Notice: Subject to any disclaimer, the term of this patent is extended or adjusted under 35 U.S.C. 154(b) by 53 days.

(21) Appl. No.: 15/251,828

(22) Filed: Aug. 30, 2016

(65) Prior Publication Data

US 2018/0056606 A1  Mar. 1, 2018

(51) Int. Cl.
| | | |
|---|---|---|
| *B33Y 50/02* | (2015.01) |
| *B29C 64/307* | (2017.01) |
| *B29C 64/106* | (2017.01) |
| *B29C 64/386* | (2017.01) |
| *B29C 64/20* | (2017.01) |
| *B33Y 30/00* | (2015.01) |
| *B29C 64/118* | (2017.01) |

(52) U.S. Cl.
CPC ............ *B33Y 50/02* (2014.12); *B29C 64/106* (2017.08); *B29C 64/20* (2017.08); *B29C 64/307* (2017.08); *B29C 64/386* (2017.08); *B33Y 30/00* (2014.12); *B29C 64/118* (2017.08)

(58) Field of Classification Search
CPC ........ B33Y 50/02; B33Y 30/00; B29C 64/307
See application file for complete search history.

(56) References Cited

U.S. PATENT DOCUMENTS

| | | | |
|---|---|---|---|
| 9,126,365 B1 | 9/2015 | Mark et al. | |
| 2009/0065965 A1* | 3/2009 | Bowen | B29B 7/42 264/148 |
| 2014/0328963 A1 | 11/2014 | Mark et al. | |
| 2015/0165666 A1* | 6/2015 | Butcher | B29C 47/0014 428/373 |
| 2016/0192741 A1* | 7/2016 | Mark | A43B 17/003 36/43 |
| 2017/0157844 A1* | 6/2017 | Mandel | B29C 64/106 |

OTHER PUBLICATIONS

International Search Report dated Nov. 14, 2017 of the corresponding International Application PCT/EP2017/070371 filed Aug. 10, 2017.

* cited by examiner

*Primary Examiner* — Jacob T Minskey
*Assistant Examiner* — Melody Tsui
(74) *Attorney, Agent, or Firm* — Norton Rose Fulbright US LLP

(57) ABSTRACT

A filament cutting device for a three-dimensional (3D) printer, the 3D printer including an extruder assembly that is configured to extrude filament onto a printing platform, the filament cutting device including: a first portion attached to the extruder assembly of the 3D printer and a second portion, where each of at least one of the first and second portions includes a respective cutting edge for cutting the filament.

17 Claims, 4 Drawing Sheets

3D PRINTER INTEGRATED FILAMENT CUTTER

FIELD OF THE INVENTION

The present invention relates to a printer for 3D or additive printing or manufacturing (3D printer), and more specifically to a filament cutting device for the 3D printer.

BACKGROUND 3D printing, or additive manufacturing, is a process of making three dimensional solid objects based on blueprints provided by digital files. The synthesis of the desired 3D object is achieved by strategically generating successive layers of an additive material (i.e., print material) in a pattern on a platform of a 3D printer until the entire object is created. The construction of the 3D object is driven by digital files that provide the specifications that describe how to create the pattern of layers and the materials used to generate the object. The digital files specifying the design are provided by the user, and examples of the digital files read by the 3D printer include G-code files, computer-aided design ("CAD") files, and other file types generally used in additive manufacturing processes.

The generation of the successive layers of the additive material can be performed, for example, according to any one of: (1) Vat Photopolymerisation, (2) Material Jetting, (3) Binder Jetting, (4) Direction Energy Deposition, (5) Powder Bed Fusion, (6) Sheet Lamination, and (7) Material Extrusion. Specific processes of Material Extrusion used to generate the successive layers can involve making sequential deposits using fused deposition modeling ("FDM"), fused filament fabrication ("FFF"), or Direct Ink Writing ("DIW").

The materials used as the "ink" of the 3D printer to generate the 3D object can include, for example, any of: powder material, polymer material, thermoplastics, eutectic metals, edible materials, rubbers, modeling clay, plasticine, metal clay, ceramic materials, metal alloys, papers, composite materials composed of ceramics and metallic materials ("cermet"), metal matrix composites, ceramic matrix composites, photopolymers, plaster, stainless steel, aluminum, plastic film, and metal foil.

3D printers are generally protected from external influences by a build cage, and, within the build cage, the 3D printer typically includes the following: (1) at least one extruder assembly, (2) a guide rail system, (3) a build platform, (4) at least one filament spool, (5) at least one motor for maneuvering the at least one extruder assembly, (6) at least one supply motor, e.g., included as part of the extruder assembly, for feeding the filament into the extruder assembly, and (7), a cooling system to regulate the temperature of the extruder. In addition, the 3D printer includes a housing that houses the aforementioned components of the 3D printer.

Typically, during the operation of an FFF 3D printer, a plastic filament is unwound from a filament spool and supplied to the extruder assembly. The extruder assembly applies heat at a specific temperature to the filament, which melts the plastic filament to start material flow. Typically, the heat is applied at an extruder print nozzle of the extruder assembly, the extruder print nozzle having an outlet for the heated filament. Once the plastic filament has begun to flow, the motor for maneuvering the extruder assembly uses the guide rail system to position (both horizontally and vertically) the extruder print nozzle relative to the build platform to apply a first layer of the 3D object to the build platform. Due the characteristics of the filament and the cooling system of the extruder assembly, the filament cools shortly after it has been extruded. Once the first layer has been applied, the extruder assembly is repositioned, and a second layer is applied on the surface of the first layer. This process is repeated until the 3D object is fully constructed.

3D printers require periodic maintenance to ensure proper functioning of the printing system. In particular, for a FFF 3D printer system, replacing the filament is an important maintenance procedure, since it is often necessary to replace an empty filament spool, change filament colors, clean components of the extruder assembly, etc.

SUMMARY

One example method of replacing the filament includes retracting the filament from the extruder assembly (i.e., reversing the direction of filament supply). However, this method often creates issues, since the filament clogs inside the extruder assembly and becomes damaged, which results in further maintenance and wasted filament.

Another approach to replacing the filament includes cutting the filament at a location between the extruder assembly and filament spool supplying the filament. The portion of filament that is left over (i.e., the portion between the cut location and the extruder nozzle) is fed through the extruder assembly and discarded. However, this method has several disadvantages. For example, a novice user may be unfamiliar with the components of a 3D printing system and therefore unable to locate where to cut the filament. Furthermore, if an inexperienced user does cut the filament, the cut may result in an unnecessary lengthy portion of filament that has to be fed through the extruder assembly and discarded. Additionally, extruder assemblies often include a housing, with the filament extending into the housing of the assembly, and cutting of the filament outside of the housing results in a lot of filament waste due to the length of filament extending inside the housing and an additional portion outside the housing below the point of the cut. This increases the amount of time required for maintenance and the amount of filament wasted.

Another disadvantage of traditional methods of cutting filament is that they often result in the cut of the filament not being at a 90° angle to the longitudinal axis of the filament, which can raise difficulties in a subsequent loading of filament. For example, if the filament is cut at a non-perpendicular angle, the subsequent filament fed into the extruder assembly will not exert the proper force on filament already present in the extruder assembly, since the subsequent filament will not have a flat surface on which to push the already present filament. This improper cutting and loading of filament causes clogging of the extruder assembly, which requires further maintenance.

Example embodiments of the present invention provide methods and systems for cutting filament of a 3D printer using an integrated filament cutter to increase ease of use, decrease the amount of wasted filament, and to minimize amount of time required for maintenance. In example embodiments, a cutting device is positioned as close as possible to a filament intake region of the supply motor. This enables cutting of the filament to occur at a location which minimizes the amount of filament to be purged (i.e., wasted filament). Moreover, in example embodiments, the cutting device is attached to the supply motor in a fixed manner, so that the cutting device can be operated with one hand, and so that a user need not maneuver the cutting device inside or outside a housing of the 3D printer system. This increases the ease of use of the 3D printer system. Furthermore, since the cutting device is attached to the supply motor in a fixed manner, and more specifically relative to a filament intake region at which the filament is fed into the supply motor, a cutting action produced when the cutting device is operated cuts the filament in a consistently flat manner, i.e., at approximately a 90° angle relative to the longitudinal extension of the filament, which minimizes further maintenance of the 3D printer system.

An example embodiment of the present invention relates to a filament cutting device for a 3D printer, the 3D printer including an extruder assembly that is configured to extrude a filament onto a printing platform, the filament cutting device including: a fixed portion attached to the extruder assembly of the 3D printer; and a movable portion, where each of at least one of the fixed portion and the movable portion includes a respective cutting edge for cutting the filament. For example, the cutting edge of the fixed portion and the cutting edge of the movable portion are situated above a filament intake region of the extruder assembly, the filament intake region being located, for example, inside a housing of the extrude assembly immediately above the supply motor. In an example embodiment, a cutting force is applicable to the movable portion, the movable portion transferring the cutting force to the cutting edge of the movable portion.

According to an example embodiment of the present invention, the extruder assembly includes a housing that houses the extruder assembly and at least a portion of the cutting device. For example, the housing covers a cutting edge of the movable portion and a cutting edge of the fixed portion. In an example embodiment, at least a portion of the movable portion is not covered by the housing, and, for example, protrudes from inside of the housing to outside of the housing.

Example embodiments of the present invention relate to a method for cutting filament of a 3D printer, the 3D printer including an extruder assembly that is configured to extrude a filament onto a printing platform, the method for cutting the filament including: cutting the filament with a filament cutting device, the filament cutting device including: a fixed portion attached to the extruder assembly of the 3D printer; and a movable portion, where each of at least one of the fixed portion and the movable portion includes a respective cutting edge for cutting the filament.

Example embodiments of the present invention relate to an extruder assembly for a 3D printer, the extruder assembly including: an extruder for extruding the filament; and a cutting device for cutting the filament, where the cutting device is attached to the extruder. In one example embodiment, the extruder assembly includes a housing for housing the extruder and the cutting device.

These and other features, aspects, and advantages of the present invention are described in the following detailed description in connection with certain exemplary embodiments and in view of the accompanying drawings, throughout which like characters represent like parts. However, the detailed description and the appended drawings describe and illustrate only particular example embodiments of the invention and are therefore not to be considered limiting of its scope, for the invention may encompass other equally effective embodiments.

DETAILED DESCRIPTION

Figure 1:
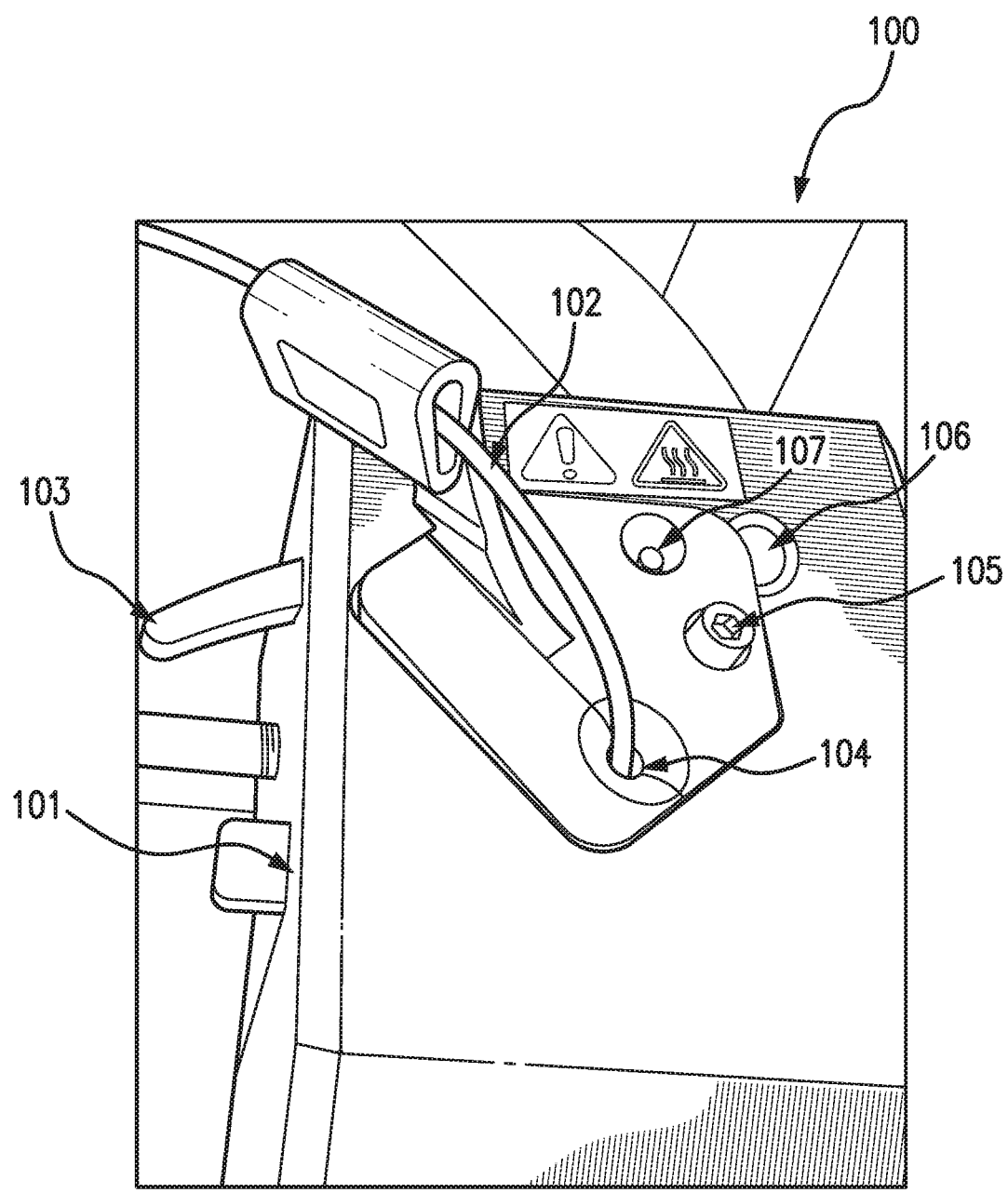
FIG. 1 is a perspective view of an example extruder assembly of a 3D printer with a housing, according to an example embodiment of the present invention.

FIG. 1 illustrates an example extruder assembly 100 of a 3D printer, including a housing 101, a filament 102, a movable portion 103 of a cutting device, and an intake region 104 of housing 101. Housing 101 also includes a housing attachment component 105, and through holes 106 and 107 through which components of fixed connections 113 and 114 (illustrated in FIG. 2) can extend. However, in other example embodiments, through holes 106 and 107 can be omitted. Housing attachment component 105 can be, for example, a screw, a bolt and nut system, or any other suitably appropriate fastening device for fastening of the housing to other components of the extruder assembly. In alternative example embodiments, other fastening components at other locations are provided for fastening the housing 101 other components of the extruder assembly 100, for example mating clips between the housing 101 and another component(s) of the extruder assembly 100.

Figure 2:
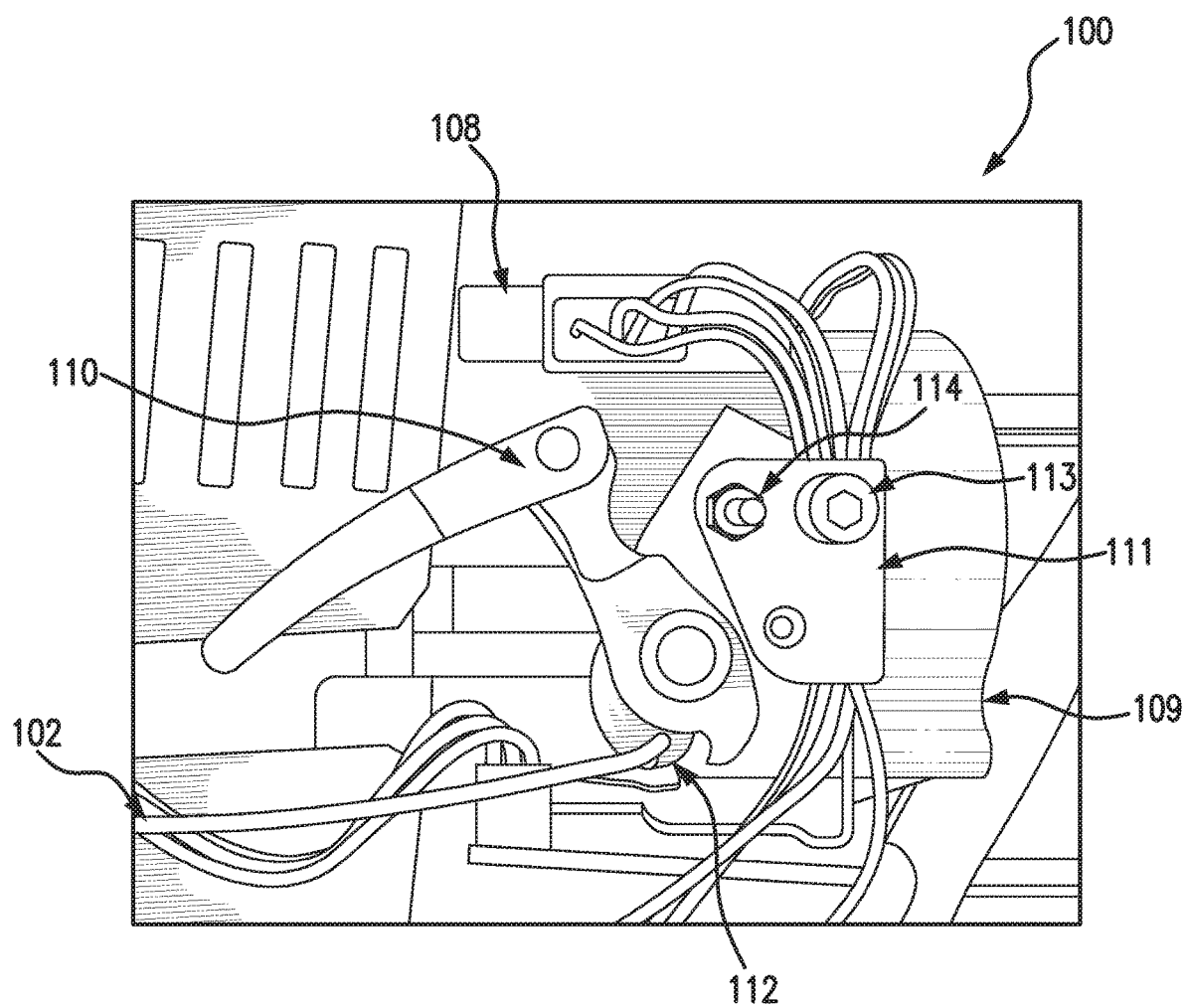
FIG. 2 is a perspective view of the example extruder assembly of the 3D printer without the housing, according to an example embodiment of the present invention.

FIG. 2 is a perspective view of example extruder assembly 100 of the 3D printer without housing 101, according to an example embodiment of the present invention. As shown in FIG. 2, the extruder assembly 100 includes a supply motor 108, a cooling device 109, such as a blower, a cutting device 110, and an attachment component, such as a plate 111. FIG. 2 also illustrates the location of filament 102 as it enters supply motor 108 at filament intake region 112. Cooling device 109 is attached to attachment plate 111, and attachment plate 111 is attached to supply motor 108, e.g., via a fixed connection (not shown). Cutting device 110 is attached to supply motor 108, e.g., via a first fixed connection 113 and a second fixed connection 114 of the cutting device 100 to the attachment plate 111. The fixed connections, including first fixed connection 113 and second fixed connection 114, can be, for example, a screw, a bolt and nut system, or any other suitably appropriate fastening component(s). In alternative example embodiments, fewer or more fixed connections can be used. In an example embodiment, the attachment of the cutting device 110 to the attachment plate 111 is such that the cutting device 110 is as close as possible to the supply motor 108 so that filament can be cut just above an upper side of the supply motor 108.

Figure 3:
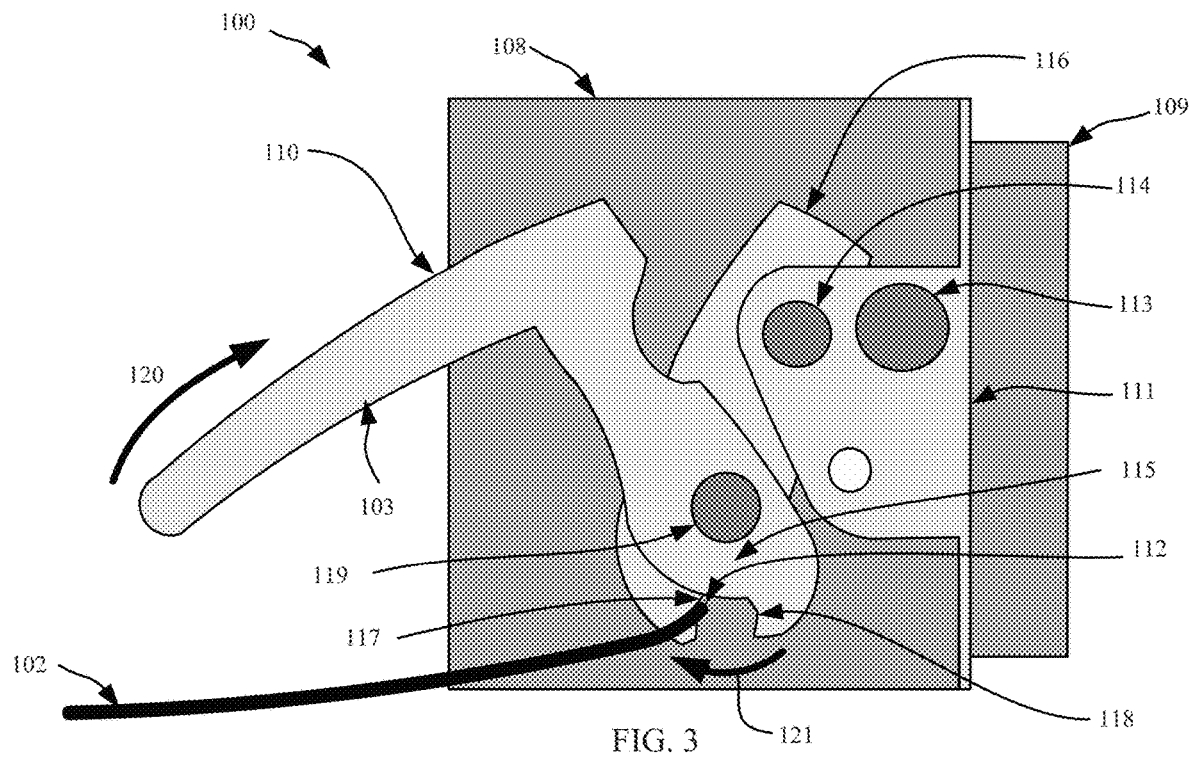
FIG. 3 is a schematic top view of the example extruder assembly of the 3D printer without the housing, according to an example embodiment of the present invention.

FIG. 3 is a schematic top view of example extruder assembly 100 of the 3D printer without housing 101, according to an example embodiment of the present invention. Extruder assembly 100 includes supply motor 108, cutting device 110, attachment plate 111, and cooling device 109. As shown in FIG. 3, cooling device 109 is attached to attachment plate 111, and attachment plate 111 is attached to supply motor 108 via first fixed connection 113. Cutting device 110 includes a fixed portion 116 and a movable portion 103, which together form a cutting region 115. Fixed portion 116 is attached to supply motor 108 via first and second fixed connections 113/114 of attachment plate 111.

Cutting region 115 includes a fixed edge 117 and a movable edge 118, where fixed edge 117 is a part of fixed portion 116 and movable edge 118 is a part of movable portion 103. Movable portion 103 is connected, e.g., hingedly, to fixed portion 116 via joint 119, about which movable portion 103 is rotatable for a rotational relative movement of movable portion 103 relative to fixed portion 116.

If cutting force 120 is applied to movable portion 103, movable portion 103 rotates about movable joint 119 and causes movable edge 118 to move towards fixed edge 117 in direction 121. If the force has sufficient magnitude, fixed edge 117 and movable edge 118 of cutting portion 115 will cut filament 102 immediately above at filament intake region 112 of supply motor 108. Cutting force 120 may be generated, for example, by a user of the 3D printer. Alternatively, a force generating device may be used to generate cutting force 120. For example, in an example embodiment, a button or switch is provided that is operable by a user for inputting a signal that causes an actuator to generate the cutting force 120. Alternatively or additionally, in an example embodiment, a control unit is provided that is configured to automatically output such a signal for example based on a print status, e.g., at the end of a print job or at a point in a programmed print job that requires the changing of filaments from one color to another color, for example when a print is of a multi-color object, requiring changing of filaments, one or more times, from one color filament to another during the single print, with the software automatically triggering the filament changes at respective stages of the print.

Figure 4:
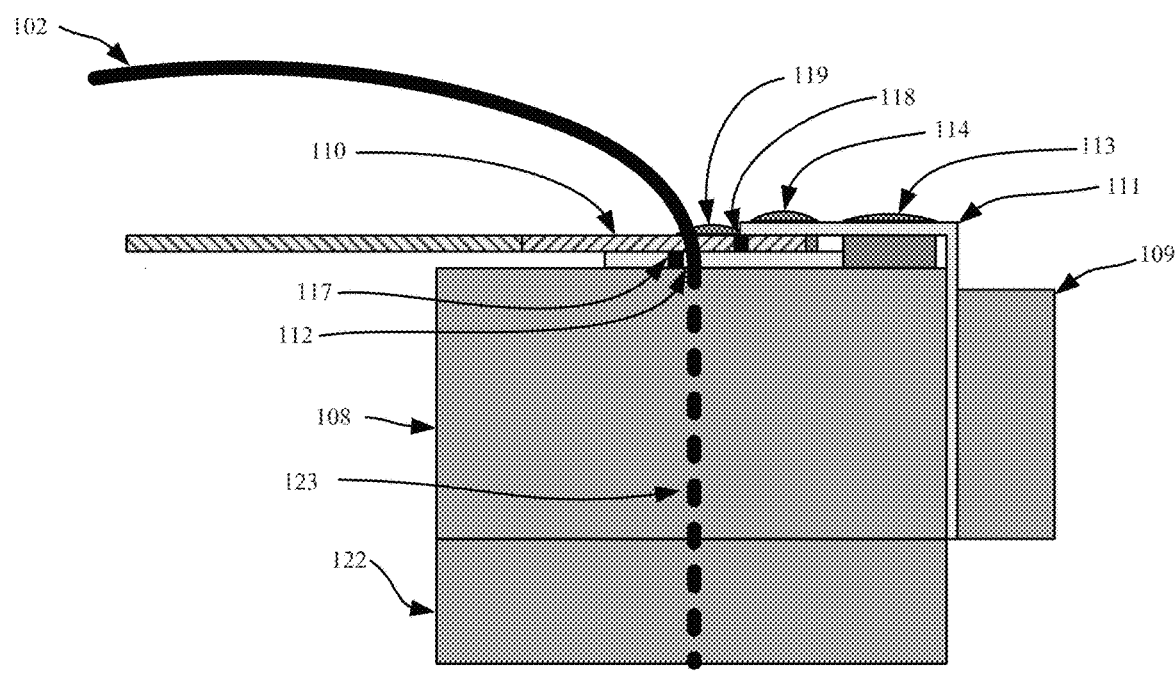
FIG. 4 is a schematic side view of the example extruder assembly of the 3D printer without the housing, according to an example embodiment of the present invention.

FIG. 4 is a schematic side view of example extruder assembly 100 of the 3D printer without housing 101, according to an example embodiment of the present invention. As shown in FIG. 4, supply motor 108 is positioned above an extruder head 122, e.g., an aluminum heating block. Supply motor 108 receives filament 102 from a filament spool (not shown) and supplies filament 102 to extruder head 122 along filament supply path 123. Cutting device 110 is positioned above supply motor 108, e.g., as close to filament intake region 112 as possible. Accordingly, cutting device 110 is able to cut filament 102 in such a way that the amount of wasted filament is minimized.

Figure 5:
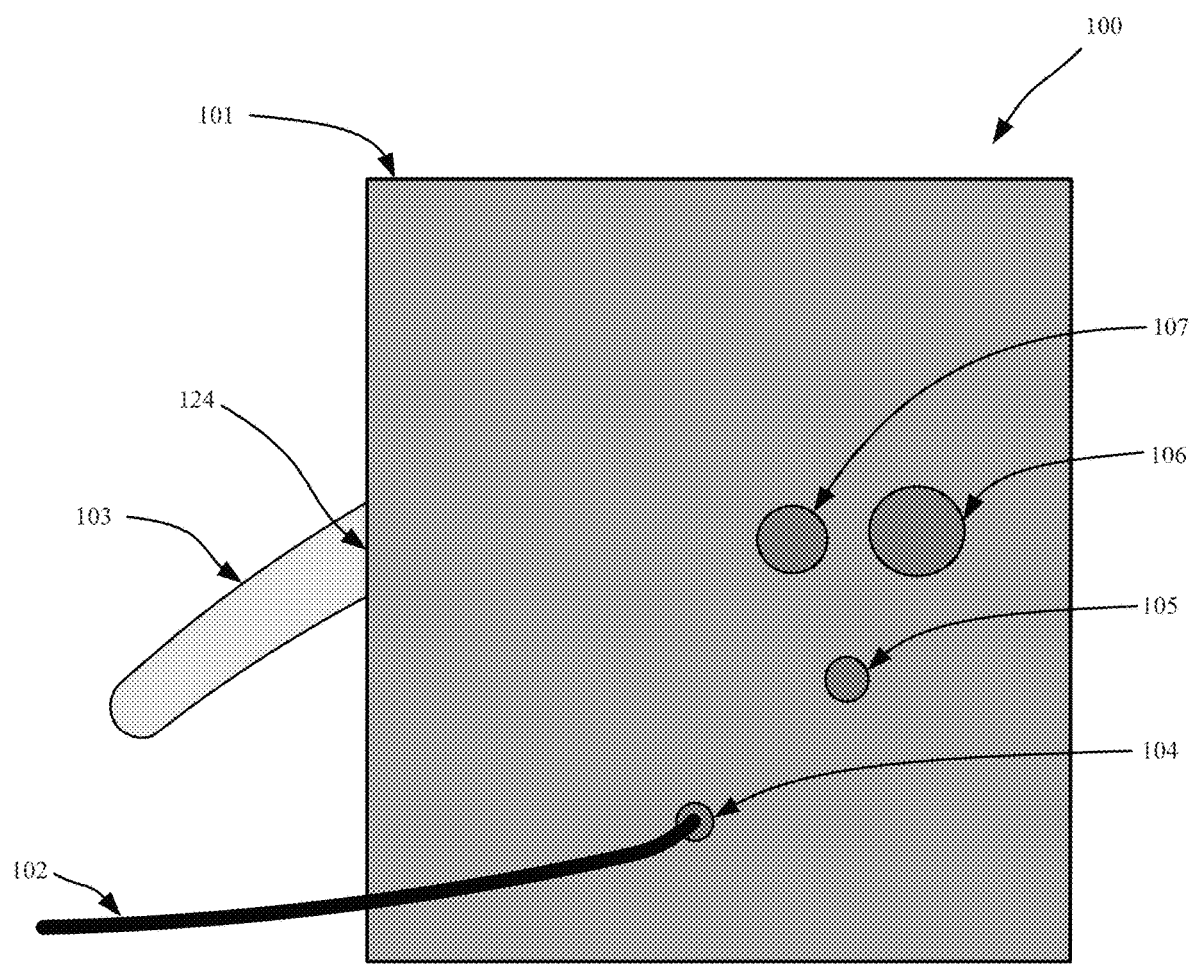
FIG. 5 is a schematic top view of the example extruder assembly of the 3D printer with a housing, according to an example embodiment of the present invention.

FIG. 5 is a schematic top view of the example extruder assembly 100 of the 3D printer with housing 101, according to an example embodiment of the present invention. As shown in FIG. 5, housing 101 has been attached to plate 111 via housing attachment component 105. In the illustrated example embodiment, housing 101 has through holes 106 and 107, which correspond to first fixed connection 113 and second fixed connection 114, respectively. Additionally, housing 101 has intake region 104, through which filament 102 is fed.

Housing 101 has an opening 124 through which a part of movable portion 103 of cutting device 110 extends. In this manner, a user can easily locate and operate movable portion 103 to apply cutting force 120 to movable portion 103 of cutting device 110 without having to remove housing 101 from extruder assembly 100.

In alternative example embodiments, cutting device 110 can take on other forms capable of cutting filament 102. For example, cutting device 110 can alternatively be a slide type cutter, a heated knife/wire cutter, a laser, a twist type cutter, or a shearing cutter. Additionally, although cutting device 110 has been described as including fixed portion 116 and movable portion 103, in an alternative example embodiments, the cutting device can include multiple movable portions, for example, in an alternative example embodiment, both portions 103 and 116 of cutting device 110 are movable. For example, in an example embodiment, a spring loaded connected between portions 103 and 116 causes movement of portion 116 in response to movement of portion 103, for example, such that cutting force 120 causes edge 118 to move in direction 121 towards edge 117 and also causes edge 117 to move in an opposite direction towards edge 118.

An example embodiment of the present invention is directed to processing circuitry configured to output a control signal that controls a motor to move a portion of a cutting device to cut a filament that has been fed into an extruder head, for example, automatically in response to reaching a predefined print status. In example embodiments, the processing circuitry, for example, includes one or more processors, which can be implemented using any conventional processing circuit and device or combination thereof, e.g., a Central Processing Unit (CPU) of a Personal Computer (PC) or other workstation processor, to execute code provided, e.g., on a non-transitory computer-readable medium including any conventional memory device, to perform the control. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more non-transitory computer-readable media, e.g., as described above, on which are stored instructions that are executable by a processor and that, when executed by the processor, perform the control.

An example embodiment of the present invention is directed to a method, e.g., of a hardware component or machine, of transmitting instructions executable by a processor to perform the control.

An example embodiment of the present invention is directed to a method, e.g., of a hardware component or machine, of performing the control.

The above description is intended to be illustrative, and not restrictive. Those skilled in the art can appreciate from the foregoing description that the present invention can be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A filament cutting device for a three-dimensional (3D) printer, the 3D printer including an extruder assembly that is configured to extrude a filament onto a printing platform, the filament cutting device comprising:
   a first portion attached to the extruder assembly of the 3D printer; and
   a second portion movable relative to the extruder assembly and the first portion, wherein:
   each of the first portion and the second portion includes a respective cutting edge for cutting the filament;

the filament cutting device is situated at a filament intake region of a filament supply path, the filament intake region positioned on the filament supply path such that the filament is cut by the filament cutting device prior to the filament entering an extruder head of the 3D printer;

the first portion of the filament cutting device is fixedly attached to a supply motor of the 3D printer such that the filament is cut by the filament cutting device prior to the filament entering the supply motor of the 3D printer; and the filament cutting device is structured such that the filament can be cut by a cutting executed by both the cutting edge of the first portion and the cutting edge of the second portion.

2. The device of claim 1, wherein a housing houses the extruder assembly and at least a portion of the cutting device.

3. The device of claim 2, wherein the cutting edge of the second portion and the cutting edge of the first portion are housed inside the housing.

4. The device of claim 2, wherein at least a portion of the second portion is positioned outside the housing.

5. The device of claim 1, wherein the second portion is hingedly connected to the first portion, a cutting force is applicable to the second portion, and the second portion is configured such that, when the cutting force is applied thereto, the second portion transfers the cutting force to the cutting edge of the second portion.

6. The device of claim 5, further comprising:
a force generating device configured to respond to an electric signal by generating the cutting force.

7. The device of claim 5, wherein the cutting force is generatable by a user of the 3D printer.

8. A method for cutting filament of a three-dimensional (3D) printer using a filament cutting device that includes a first portion and a second portion, the 3D printer including an extruder head that is configured to extrude a filament onto a printing platform, the filament cutting device being structured such that the filament can be cut by a cutting executed by both a cutting edge of the first portion and a cutting edge of the second portion, the method for cutting the filament comprising:

the second portion of the filament cutting device moving relative to the extruder head and relative to the first portion of the filament cutting device under a force applied to the second portion of the cutting device so that the cutting edge of the second portion approaches the cutting edge of the first portion, thereby cutting the filament that is sandwiched between the cutting edges, wherein:

the first portion of the filament cutting device (a) is fixedly attached to a supply motor of the 3D printer such that the filament is cut by the filament cutting device prior to the filament entering the supply motor of the 3D printer, and (b) is connected to the extruder head; and the filament cutting device is situated at a filament intake region that is positioned on a filament supply path such that the filament is cut by the filament cutting device prior to the filament entering the extruder head.

9. The method of claim 8, wherein the cutting edge of the first portion and the cutting edge of the second portion are situated above the filament intake region of the extruder head.

10. The method of claim 8, wherein the extruder head is part of an extruder assembly that includes a housing that houses the extruder head and at least a portion of the cutting device.

11. The method of claim 10, wherein the cutting edge of the second portion and the cutting edge of the first portion are housed in the housing.

12. The method of claim 10, wherein at least a portion of the second portion is positioned outside the housing.

13. The method of claim 10, wherein the second portion is hingedly connected to the first portion, and the second portion is configured such that, when the force is applied to the second portion at a first side of the hinged connection, thereby rotating the second portion about the hinged connection, the second portion transfers the force to the cutting edge of the second portion at an opposite side of the hinged connection.

14. The method of claim 1, wherein a force generating device generates the force.

15. The method of claim 1, wherein a user of the 3D printer generates the force.

16. An extruder assembly for a three-dimensional (3D) printer, the extruder assembly comprising:
an extruder for extruding a filament onto a printing platform; and
a cutting device for cutting the filament, wherein:
the cutting device includes a first portion attached to the extruder and a second portion that is movable relative to the extruder and to the first portion;
each of the first portion and the second portion includes a respective cutting edge for cutting the filament;
the filament cutting device is situated at a filament intake region on a filament supply path such that the filament is cut by the filament cutting device prior to the filament entering an extruder head of the extruder;
the first portion of the filament cutting device is fixedly attached to a supply motor of the 3D printer such that the filament is cut by the filament cutting device prior to the filament entering the supply motor of the 3D printer; and
the filament cutting device is structured such that the filament can be cut by a cutting executed by both the cutting edge of the first portion and the cutting edge of the second portion.

17. The extruder assembly of claim 16, further comprising:
a housing for housing the extruder and the cutting device; and
the supply motor, which is configured to supply the filament to the extruder, wherein the supply motor is positioned between the cutting device and the extruder along the filament supply path.

* * * * *